March 18, 1958 G. E. KADISCH ET AL 2,827,393
METHOD OF GLASS ENAMELING FOIL
Filed Feb. 11, 1954
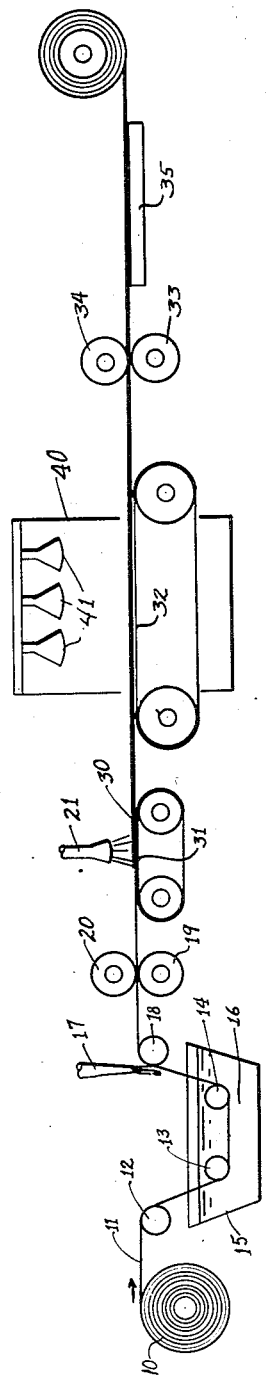
INVENTORS
GERHARD E. KADISCH
WILLIS D. KLEPPINGER
PAUL A. HUPPERT
BY
Greene, Pineles and Durr

United States Patent Office 2,827,393
Patented Mar. 18, 1958

2,827,393
METHOD OF GLASS ENAMELING FOIL

Gerhard E. Kadisch and Willis D. Kleppinger, Watchung, and Paul A. Huppert, Plainfield, N. J., assignors to General Ceramics Corporation, a corporation of Delaware Application February 11, 1954, Serial No. 409,744

3 Claims. (Cl. 117—65)

This invention relates to a glass enameled foil and process of making the same.

Glass enameled surfaces are washable, sterilizable, waterproof, heat and fire resistant, and attractive in appearance. The construction industries could make use of a structural panel or a sheet material with a glass enameled surface, if obtainable at a reasonable price.

Among the objects of this invention is to provide thin foil materials, such as aluminum or aluminum alloy foils, with a glass enameled surface which is adherent to the foil.

Among other objects of the invention is to provide a process of coating thin metallic foil materials with a glass enamel.

These objects and others ancillary thereto are obtained by providing a non crinkled aluminum or aluminum alloy foil washing the surface of the foil, applying a slip of aluminum enamel to one side of the foil, drying and firing at 940–1040° F. for from 2–10 minutes and thereafter cooling. The once coated foil has a thickness of 2–5 mil whereas the aluminum foil itself has a thickness of less than 3 mils.

The aluminum or aluminum alloy foil may be supplied in rolls and the process may be made continuous. The product obtained may be flexed without cracking and if any crinkles occur in the final product they may be removed by a smoothing device such as hot iron. The substantially pure aluminum foil is very satisfactory for the process and so are the foils made of aluminum magnesium alloys.

Where a matt finish is desired in the enamel surface pigments such as aluminum oxide or titanium dioxide are added to the enamel slip. Such pigments may be added in proportions of 5 to 15% of the total solid content of the enamel slip.

The aluminum enamel compositions available commercially may be employed. A very satisfactory enamel is lead free, silica containing lithium-barium-boron composition for enameling aluminum which is disclosed in the application of Paul A. Huppert, Serial No. 409,525, filed February 10, 1954. The frit employed in this composition comprises the following ingredients:

|   | Percent |
|---|---|
| $LiO_2$ | 5–15 |
| $BaO$ | 3–10 |
| $B_2O_3$ | 5–10 |
| $Al_2O_3$ | 0–15 |
| $(PO_4)P_2O_5$ | 5–15 |
| $SiO_2$ | 5–25 |
| $CaO$, $K_2O$, $Na_2O$, $TiO_2$, and/or $ZrO_2$ | Balance |

The slip is preferably suspended in a liquid consisting essentially of isopropyl alcohol and water and it will be noted that no additional suspending agents such as clay or polyvinyl alcohol or other organic or inorganic gelling agent is added as a suspending agent.

Some advantage is obtained by prefiring the aluminum foil to approximately the maturing temperature of the slip to be applied, i. e., to approximately 940–1040° F.

Where especially decorative or light shades of colors are desired in the enamel coating two or more coats of the enamel may be applied. The first coat is applied and fired and thereafter a second slip coating is applied and fired on top of the first coat.

The invention, both as to its organization and its method of operation together with additional objects and advantages thereof will best be understood from the following description of specific embodiments thereof, when read in connection with the accompanying drawing in which The figure illustrates the process by which the enameled foil is prepared continuously.

In the drawing the aluminum or aluminum alloy foil is shown in the form of a roll 10. The foil 11 from this roll 10 is fed over roll 12, and under rolls 13, 14 which holds the foil submerged in bath 15 containing detergent 16. As the film or foil 11 comes from the bath 15 it is sprayed with pure water passed over guide 18 and between pressing or smoothing rollers 19, 20. The film does not need to be dried. Thereafter, the film is passed under the spray device 21 which sprays the coating 30 on the foil 11. While being sprayed the film may, if desired, be supported on belt conveyor 31. Thereafter, the slip-coated foil 11—30 passed to the drying and firing device 40 wherein the layer 30 is first dried and then fired at 940–1040° F. If desired a separate drying oven may be employed but with the infra red lamp type of dryer a low temperature drying may be provided at the entrance end and the higher temperature firing adjacent the exit end. While passing through the oven 40 the coated foil may be supported on the conveyor belt 32. The drying oven 40 is provided with suitable heating means such as infra red lamps 41.

After leaving the oven 40 the coated foil is again smoothed by rollers and passes to cutting table 35 whereupon it is cut to sheets of the desired length.

The product of the invention has chemically resistant, water proof, washable enamel layer of desirable appearance. The coated sheets may be employed as a laminating layer to provide an attractive heat and fire resistant outer layer for laminated wood or sheets of wood composition, for sheet metal, etc., or the enameled foils may be employed directly, as a wall paper, for example.

The following example further illustrates how the product is made.

Example

Foil made of substantially pure aluminum and having a thickness of approximately .001" is cleaned in an aqueous bath containing a detergent (which must not contain free alkali which attacks aluminum). The foil while still wet is sprayed with an enameling frit for enameling aluminum such as one prepared as described below. A frit is prepared by smelting the following ingredients for 55 minutes at 1850° F.

|   | Parts (by weight) |
|---|---|
| Spodumene | 10 |
| Borax | 10 |
| Flint ($SiO_2$) | 9 |
| Lithium carbonate | 5 |
| Sodium nitrate | 8 |
| Soda ash | 8 |
| Barium carbonate | 8 |
| Titanium dioxide | 8 |
| Calcium pyrophosphate | 10 |
| Aluminum metaphosphate | 10 |
| Lithium fluoride | 8 |
| Lithium silicate | 6 |

This frit was water quenched and then ground in a porcelain pebble mill while adding the following ingredients.

| | Percent |
|---|---|
| Isopropyl alcohol | 50 |
| Water | 5 |
| Lithium silicate | ½ |
| Lithium titanate | ½ |
| Lithium borate | ½ |
| Lithium hydroxide | ½ |
| Lithium fluoride | ½ |

These latter 5 ingredients are not absolutely essential but they act as fluxes and improve the firing characteristics of the slip. Commercially available compositions for enameling aluminum which compositions mature at 940–1040° F. may be substituted for the above.

The grinding of the frit is continued until no residue is noted on a 325 mesh sieve.

The slip coated foil is passed onto conveyor belt 32 and through drying and firing oven 40 wherein the frit is matured. The speed of the travel of the foil is adjusted so as to permit the dried slip-coated foil to pass through the last portion of the oven maintained at a temperature of 985° F. in approximately 8 minutes. After firing the foil is again flattened by passing between rollers 33, 34 which may be heated to a temperature of 120 to 280° F. and is cut to the size desired.

The features and principles underlying the invention described above in connection with specific exemplifications will suggest to those skilled in the art many other modifications thereof. It is accordingly desired that the appended claims shall not be limited to any specific feature or details thereof.

We claim:

1. A process of making glass enameled aluminum foil comprising the steps of providing a substantially continuous strip of aluminum foil having a thickness of less than .003", continuously moving the flat strip through a first zone, applying an enamel slip capable of maturing at a temperature of 940°–1040° F. to said foil in said first zone, continuously supporting and passing the foil horizontally without tension through a heating device heated to the maturing temperature of said slip and continuously smoothing the enamel coated foil by passing it over an ironing means heated to a temperature below the maturing temperature of the enamel.

2. The process as set forth in claim 1 in which the enamel slip is dispersed in a mixture consisting essentially of a major proportion of isopropyl alcohol and a minor proportion of water in the absence of other suspending agents.

3. The process as set forth in claim 1 in which the enamel slip composition consists essentially of the following components in the proportions set forth:

| | Percent |
|---|---|
| $LiO_2$ | 5–15 |
| $BaO$ | 3–10 |
| $B_2O_3$ | 5–10 |
| $Al_2O_3$ | 0–15 |
| $(PO_4)P_2O_5$ | 5–15 |
| $SiO_2$ | 5–25 | the balance of said composition being selected from the group consisting of $CaO$, $K_2O$, $Na_2O$, $TiO_2$, $ZrO_2$ and mixtures thereof.

References Cited in the file of this patent

UNITED STATES PATENTS

| 2,321,656 | Chester | June 15, 1943 |
| 2,424,353 | Essig | July 22, 1947 |
| 2,480,711 | Calton | Aug. 30, 1949 |
| 2,482,533 | Andrews | Sept. 20, 1949 |
| 2,608,490 | Donahey | Aug. 26, 1952 |
| 2,660,531 | Fraser et al. | Nov. 24, 1953 |